(12) United States Patent
Niemann et al.

(10) Patent No.: US 8,074,527 B2
(45) Date of Patent: Dec. 13, 2011

(54) MONITORING SYSTEM FOR A HYBRID DRIVE

(75) Inventors: Holger Niemann, Ludwigsburg (DE); Thorsten Juenemann, Sindelfingen (DE)

(73) Assignee: Robert Bosch GmbH, Stuttgart (DE)

( * ) Notice: Subject to any disclaimer, the term of this patent is extended or adjusted under 35 U.S.C. 154(b) by 135 days.

(21) Appl. No.: 12/223,231

(22) PCT Filed: Jan. 30, 2007

(86) PCT No.: PCT/EP2007/050888
§ 371 (c)(1),
(2), (4) Date: Apr. 6, 2010

(87) PCT Pub. No.: WO2007/088162
PCT Pub. Date: Aug. 9, 2007

(65) Prior Publication Data
US 2010/0186522 A1    Jul. 29, 2010

(51) Int. Cl.
GOIL 3/02       (2006.01)
(52) U.S. Cl. ................ 73/862.193; 73/862.08
(58) Field of Classification Search ............. 73/862.193, 73/82.08
See application file for complete search history.

(56) References Cited

U.S. PATENT DOCUMENTS

| | | | | |
|---|---|---|---|---|
| 4,738,145 | A * | 4/1988 | Vincent et al. | 73/862.23 |
| 6,125,322 | A * | 9/2000 | Bischof et al. | 701/114 |
| 6,285,946 | B1 * | 9/2001 | Steinmann | 701/110 |
| 6,336,063 | B1 | 1/2002 | Lennevi | |
| 6,359,404 | B1 | 3/2002 | Sugiyama et al. | |
| 7,346,445 | B2 * | 3/2008 | Von Schwertfuehrer | 701/103 |
| 7,383,902 | B2 * | 6/2008 | Matsuzaki et al. | 180/65.285 |
| 7,500,465 | B2 * | 3/2009 | Pfaeffle et al. | 123/299 |
| 2003/0176256 | A1 | 9/2003 | Kamichi | |
| 2005/0000276 | A1 * | 1/2005 | Bauer et al. | 73/117.3 |
| 2009/0204279 | A1 * | 8/2009 | Von Schwertfuehrer et al. | 701/22 |
| 2009/0305842 | A1 * | 12/2009 | Seel et al. | 477/3 |

FOREIGN PATENT DOCUMENTS

| | | |
|---|---|---|
| EP | 1 464 876 | 10/2004 |
| JP | 10-341503 | 12/1998 |
| JP | 10341503 | 12/1998 |
| JP | 2000-1133 | 1/2000 |
| JP | 2000-213386 | 8/2000 |
| JP | 2000213386 | 8/2000 |
| JP | 2001-157309 | 6/2001 |
| JP | 2001157309 | 6/2001 |
| JP | 2003-219509 | 7/2003 |

* cited by examiner

Primary Examiner — Max Noori
(74) Attorney, Agent, or Firm — Kenyon & Kenyon LLP

(57) ABSTRACT

The invention relates to a method for the continuous torque monitoring of a hybrid drive composed of an internal combustion engine with an engine control unit and an inherently safe electric drive with a control unit, wherein a permissible total torque is compared with the sum of an actual torque of the electric drive and an actual torque of the internal combustion engine. If the permissible total torque is reduced by the actual torque of the electric motor and is formed by a permissible torque of the internal combustion engine, it is largely possible by means of this method for existing software to be utilized further, and said software need not be amended. In the engine controller, it is largely possible for calculations to be carried out with torques which are normalized to the maximum torque of the internal combustion engine. In the comparison stage in particular, the value range of the torques in the case of a hybrid drive in relation to that in the case of a pure internal combustion engine is maintained. Storage-space-saving and calculation-duration-saving programming is therefore possible.

6 Claims, 1 Drawing Sheet

US 8,074,527 B2

MONITORING SYSTEM FOR A HYBRID DRIVE

FIELD OF THE INVENTION

The present invention relates to a method for continuous torque monitoring of a hybrid drive of an internal combustion engine having an engine control unit and an intrinsically safe electric drive having a control unit, an admissible total torque being compared with the sum of an actual torque of the electric drive and an actual torque of the internal combustion engine.

BACKGROUND INFORMATION

Such continuous torque monitoring is used to detect a possible malfunction of a control unit for an automotive drive or of the automotive drive itself for protecting the occupants of a vehicle as well as outside traffic. If a malfunction is detected, an error response is initiated and the vehicle is converted to a safe vehicle state. For torque monitoring, an admissible total torque is ascertained continuously during operation from a vehicle driver input and is compared with a total actual torque of the drive. In the case of a hybrid drive of an internal combustion engine and an electric drive, the total actual torque is ascertained from the sum of the actual torques of the internal combustion engine and of the electric drive. If the total of the actual torques of the internal combustion engine and of the electric drive exceeds the admissible total torque, an error signal is delivered and the vehicle is converted to a safe vehicle state.

In a gasoline engine, the actual torque of the internal combustion engine is determined from measured values for the air flow rate, the lambda value and the firing angle. For a diesel engine, the actual torque is determined from the fuel pressure, valve opening time and valve closing time as injection parameters. The admissible total torque is determined from the accelerator pedal signal, data from driver assistance systems, gearing data, ESP intervention procedures and torque loss.

To improve functional reliability, the admissible torque and the actual torque of an internal combustion engine are determined by redundantly executed software from redundantly detected input signals of the engine control unit of the internal combustion engine. According to the related art, variables are stored in duplicate, there is a cyclic review of the RAM and ROM memories, and a program sequence control and a command test are provided. Because of extensive monitoring measures, software that allows a rapid program sequence to allow torque monitoring to respond rapidly to malfunctions must be implemented. This is achieved by expressing the variables for the actual torque of the internal combustion engine and for the admissible torque as relative quantities with respect to the maximum possible torque of the internal combustion engine ("standardization torque"). In this way, the ROM code required for torque monitoring is typically reduced by a factor of two to four in comparison with an implementation with absolute torques.

The actual torque of the intrinsically safe electric drive is relayed from its control unit to the engine control unit of the internal combustion engine via a secured communication. In doing so, the value of the setpoint torque of the electric drive is reported together with a diagnostic status to the engine control unit of the internal combustion engine. Since the electric drive is intrinsically safe, the setpoint torque and actual torque are the same, unless the diagnostic status indicates that there is a malfunction in the electric drive.

An object of the present invention is to provide a method which allows simple expansion of torque monitoring for an internal combustion engine to torque monitoring for a hybrid drive.

SUMMARY OF THE INVENTION

This object is achieved by reducing the admissible total torque by subtracting the actual torque of the electric drive and forming an admissible torque of the internal combustion engine. This method makes it possible to continue to use existing software to a large degree without upgrading. In the engine control, torques standardized to the maximum torque of the internal combustion engine may be largely expected. In the comparison stage in particular, the value range of torques in a hybrid drive is maintained in comparison with that in an internal combustion engine alone. A program which saves on memory capacity and calculation time is thus possible.

If the actual torque of the electric drive is subtracted from the admissible total torque in a subtraction stage in the engine control unit of the internal combustion engine, the engine control of the internal combustion engine and the programming contained therein may remain largely unchanged in the expansion of the monitoring of the hybrid drive. This facilitates the creation and maintenance of programs for engine control, because one version may be used for both types of drives. The admissible torque of the internal combustion engine formed in the subtraction stage is then comparable to the admissible torque known from straight internal combustion engine operation and may be compared with the actual torque of the internal combustion engine.

DETAILED DESCRIPTION

Figure 1:
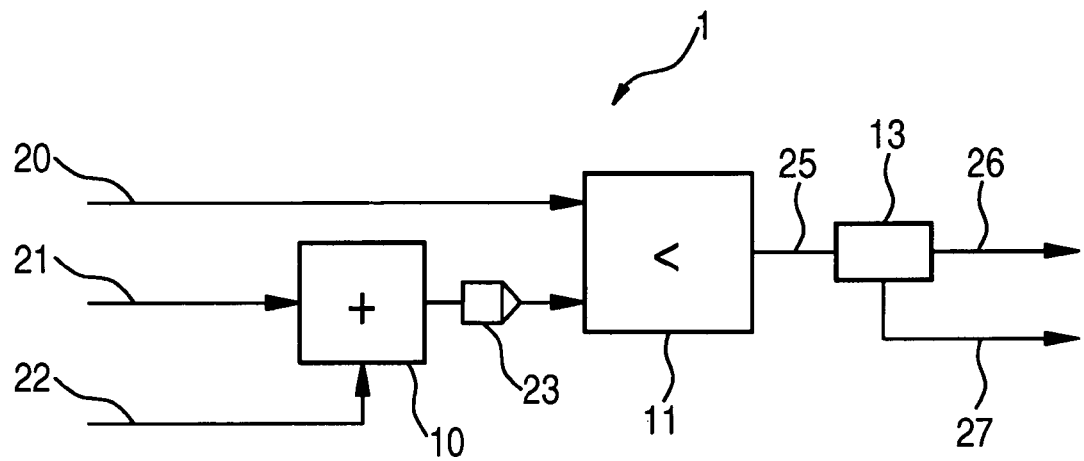
FIG. 1 schematically shows continuous torque monitoring for a hybrid drive.

FIG. 1 shows torque monitoring 1 for a hybrid drive of an electric motor and an internal combustion engine. Torque monitoring 1 includes a summation stage 10, a comparison stage 11 and a decision stage 13. A total actual torque 23 is formed in summation stage 10 from an actual torque of electric drive 21 and an actual torque of internal combustion engine 22. Total actual torque 23 is compared with an admissible total torque 20 of the hybrid drive in comparison stage 11, comparison stage 11 delivering a comparative signal 25 indicating whether total actual torque 23 exceeds admissible total torque 20. In such a case, decision stage 13 downstream from comparison stage 11 delivers an error signal 26 and an engine control (not shown here) converts the vehicle to a safe vehicle state. If total actual torque 23 is less than admissible total torque 20, decision stage 13 forwards a release signal 27 to the engine control, so that normal driving operation may be continued. Maximum prevailing allowed total torque 20 corresponds to the sum of the maximum actual torques of electric drive 21 and the maximum actual torque of the internal combustion engine.

Figure 2:
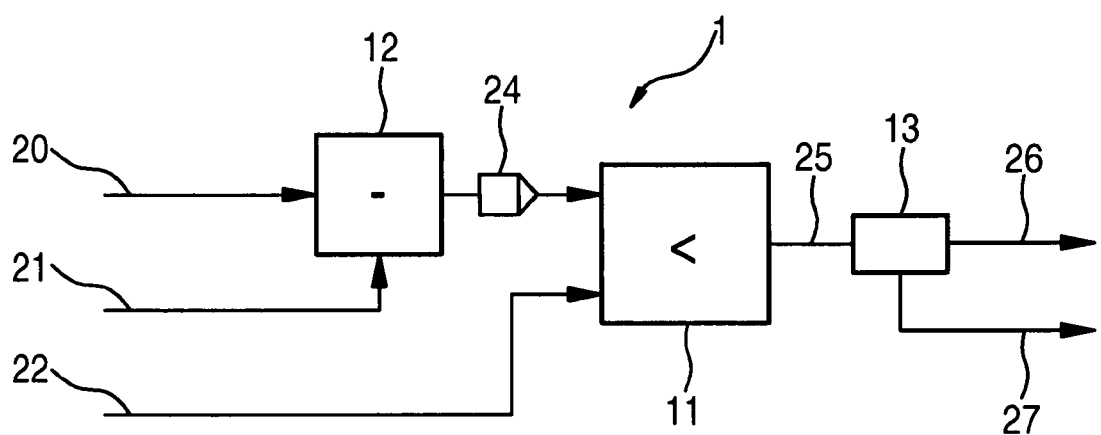
FIG. 2 shows torque monitoring in the embodiment according to the present invention.

FIG. 2 shows torque monitoring 1 for a hybrid drive in the embodiment according to the present invention. Torque monitoring 1 includes a subtraction stage 12, comparison stage 11 and decision stage 13. In subtraction stage 12, the actual torque of electric drive 21 is subtracted from admissible total torque 20, thus forming an admissible torque of internal combustion engine 24. In comparison stage 11, the admissible torque of internal combustion engine 24 is compared with the actual torque of internal combustion engine 22 and comparison signal 25 is output, indicating whether the admissible torque of internal combustion engine 24 is less than the actual torque of internal combustion engine 22. If comparison signal 25 indicates that the admissible torque of internal combustion engine 24 is less than the actual torque of internal combustion engine 22, error signal 26 is triggered by decision stage 13 and the vehicle is converted to a safe vehicle state. In the other case, decision stage 13 relays release signal 27 to the engine control so that normal driving operation may be continued.

In torque monitoring 1, the values for the quantities for admissible total torque 20, the actual torque of electric drive 21, the actual torque of internal combustion engine 22, total actual torque 23 and the admissible torque of internal combustion engine 24 are expressed as relative values with respect to a maximum torque of the internal combustion engine because this method allows substantial savings in memory capacity. In the case of a drive which is operated exclusively with an internal combustion engine, values in the range of 0% to 100% therefore occur. However, if an electric drive is added to a hybrid drive, admissible total torque 20 may exceed a value of 100%. Based on the memory capacity-saving implementation of the quantities in the software, however, only values up to 100% are displayable. Without the embodiment according to the present invention, the torque of the hybrid drive would have to be reduced to the maximum torque of the internal combustion engine. By subtracting the actual torque of electric drive 21, the comparison of torques in comparison stage 11 may be made between the admissible torque of internal combustion engine 24 and the actual torque of internal combustion engine 22, both of which are in the value range of 0% to 100%. For the hybrid drive, the torque comparison as well as the determination of the actual torque of internal combustion engine 22 from the engine control of the internal combustion engine may thus be used with no change. Admissible total torque 20, however, may also assume values greater than 100% in the method described here, so that the savings in memory capacity is not able to be achieved.

An implementation of torque monitoring 1 that consistently saves on memory capacity would be conceivable by basing all quantities on the sum of the maximum torques of the internal combustion engine and electric drive. However, this would mean a revision of the calculation of the actual torque of internal combustion engine 22 in which its engine control would have to be upgraded and updated. In particular, the maximum torque of the internal combustion engine would then no longer be occupied by the value 100%, which could result in complications in programming of engine controls when engine controls are operated in parallel for hybrid drives and internal combustion engines alone. A restriction on the value range of the torques of the internal combustion engine would also reduce the resolution of the numerical values of the quantities and would thus result in inaccuracies.

What is claimed is:

1. A method for continuous torque monitoring of a hybrid drive of an internal combustion engine having an engine control unit and an intrinsically safe electric drive having a control unit, the method comprising:
   comparing an admissible total torque with a sum of an actual torque of the electric drive and an actual torque of the internal combustion engine;
   subtracting the actual torque of the electric drive from the admissible total torque in a subtraction stage in the engine control unit of the internal combustion engine; and
   forming an admissible torque of the internal combustion engine.

2. A method for continuous torque monitoring of a hybrid drive of an internal combustion engine having an engine control unit and an intrinsically safe electric drive having a control unit, the method comprising:
   reducing an admissible total torque by an actual torque of the electric drive, thereby forming an admissible torque of the internal combustion engine;
   comparing the admissible torque of the internal combustion engine to an actual torque of the internal combustion engine; and
   if the comparing indicates that the admissible torque of the internal combustion engine is less than the actual torque of the internal combustion engine, generating an error signal indicating an unsafe vehicle state.

3. The method of claim 2, wherein the reducing is performed by subtracting the actual torque of the electric drive from the admissible total torque in a subtraction stage in the engine control unit of the internal combustion engine.

4. The method of claim 2, wherein the admissible total torque is equal to the sum of a maximum actual torque of the electric drive and a maximum actual torque of the internal combustion engine.

5. A method for adapting a continuous torque monitoring system of an internal combustion engine for operation in a hybrid mode in conjunction with an electric drive, comprising:
   in a comparator stage of an engine control unit of the internal combustion engine, substituting an existing admissible torque signal with a new admissible torque signal formed by subtracting an actual torque of the electric drive from an admissible total torque, wherein the comparator stage is initially configured to compare the existing admissible torque signal to an actual torque of the internal combustion engine.

6. The method of claim 5, wherein the admissible total torque is equal to the sum of a maximum actual torque of the electric drive and a maximum actual torque of the internal combustion engine.

* * * * *